United States Patent
Lesellier et al.

(10) Patent No.: US 7,805,018 B2
(45) Date of Patent: Sep. 28, 2010

(54) DYNAMIC DETECTION OF BLOCKING ARTIFACTS

(75) Inventors: Estelle Lesellier, Boulogne (FR);
Carolina Miro Sorolla, Suresnes (FR);
Vincent Ruol, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 854 days.

(21) Appl. No.: 10/522,467

(22) PCT Filed: Jul. 9, 2003

(86) PCT No.: PCT/IB03/03130

§ 371 (c)(1),
(2), (4) Date: Jan. 26, 2005

(87) PCT Pub. No.: WO2004/014084

PCT Pub. Date: Feb. 12, 2004

(65) Prior Publication Data

US 2005/0271287 A1    Dec. 8, 2005

(30) Foreign Application Priority Data

Jul. 31, 2002 (FR) .................................. 02 09746

(51) Int. Cl.
*G06K 9/40* (2006.01)
*G06F 17/10* (2006.01)
(52) U.S. Cl. ..................... 382/275; 382/266; 708/300
(58) Field of Classification Search ................ 382/254, 382/260, 263, 265, 266, 268, 275; 708/300; 348/606
See application file for complete search history.

(56) References Cited

U.S. PATENT DOCUMENTS

| 5,300,786 | A | * | 4/1994 | Brunner et al. | ............. 250/548 |
| 5,579,121 | A | * | 11/1996 | Ohta et al. | .................. 386/109 |
| 5,790,269 | A | * | 8/1998 | Masaki et al. | ............... 358/447 |

(Continued)

FOREIGN PATENT DOCUMENTS

EP    1223763 A1    7/2002

(Continued)

OTHER PUBLICATIONS

Chan et al. "Blocking Artifact Reduction in JPEG Coded Images" Image Processing 1999, ICIP Proceedings International Conference, Kobe, Japan. vol. 2 Oct. 24, 1999, pp. 894-898.*

(Continued)

*Primary Examiner*—Bhavesh M Mehta
*Assistant Examiner*—Mia M Thomas (57) ABSTRACT

The present invention relates to a method of processing a sequence of digital images, intended to detect, in a dynamical manner, a grid comprising blocking artefacts. Said method comprises the steps of, a) detecting (100) a current spatial grid (SG(t)) within a portion of the image constituted by a current field (FLD(t)), b) determining (200) a current reference grid (RG(t)) from a current spatial grid (SG(t)) and a preceding reference grid (RG(t-1)) supplied by a memory MEM (150), the current reference grid (RG(t)) being subsequently stored temporarily in the memory MEM (150), and c) correcting COR (300) blocking artefacts which are present in the current field (FLD(t)) from the preceding reference grid (RG(t-1)) so as to supply a processed field (PPP(t)).

8 Claims, 3 Drawing Sheets

U.S. PATENT DOCUMENTS

| | | | | |
|---|---|---|---|---|
| 5,822,469 | A * | 10/1998 | Silverstein | 382/267 |
| 6,025,876 | A * | 2/2000 | Bramley | 375/240.01 |
| 6,333,990 | B1 * | 12/2001 | Yazici et al. | 382/132 |
| 6,427,031 | B1 * | 7/2002 | Price | 382/264 |
| 6,438,275 | B1 * | 8/2002 | Martins et al. | 382/300 |
| 6,496,605 | B1 * | 12/2002 | Osa | 382/268 |
| 6,583,897 | B1 * | 6/2003 | Harrington | 358/532 |
| 6,611,361 | B1 * | 8/2003 | Hong | 358/474 |
| 6,612,159 | B1 * | 9/2003 | Knutrud | 73/105 |
| 6,728,414 | B1 * | 4/2004 | Chang et al. | 382/254 |
| 6,738,528 | B1 * | 5/2004 | Nio et al. | 382/268 |
| 6,859,558 | B2 * | 2/2005 | Hong | 382/236 |
| 6,869,739 | B1 * | 3/2005 | Ausschnitt et al. | 430/30 |
| 6,937,337 | B2 * | 8/2005 | Ausschnitt et al. | 356/401 |
| 6,950,473 | B2 * | 9/2005 | Kim et al. | 375/240.29 |
| 6,950,605 | B1 * | 9/2005 | Smolenski et al. | 386/126 |
| 7,003,174 | B2 * | 2/2006 | Kryukov et al. | 382/266 |
| 7,027,661 | B2 * | 4/2006 | Estevez et al. | 382/275 |
| 7,031,552 | B2 * | 4/2006 | Kim | 382/275 |
| 7,072,393 | B2 * | 7/2006 | Boice et al. | 375/240.01 |
| 7,173,968 | B1 * | 2/2007 | Kutka et al. | 375/240 |
| 7,593,592 | B2 * | 9/2009 | Lesellier | 382/275 |
| 7,606,423 | B2 * | 10/2009 | Caviedes et al. | 382/199 |
| 7,643,688 | B2 * | 1/2010 | Samadani et al. | 382/232 |

FOREIGN PATENT DOCUMENTS

WO      WO0120912 A1      3/2001

OTHER PUBLICATIONS

Minami et al. "An Optimization Approach for Removing Blocking Effects in Transform Coding" IEEE Transactions on Circuits and Systems for Video Technology, vol. 5. No. 2, Apr. 1995, pp. 74-82.*

Zhongjie et al. "New Approach to Reducing Blocking Effects in Stereo Video Coding" 2002 6th International Conference on Signal Processing, vol. 2, Aug. 26-30, 2002. pp. 1027-1030.*

Hahoud et al. "Improved Method for Blocking Artifact Reduction in Block Coded Images in Wavelet-Transform Domain" 19th Annual National Radio Science Conference, Alexandria, Mar. 19-21, 2002. pp. 301-308.*

Lesellier E. et. al.; Robust Wavelet-Based Arbitrary Grid Detection for MPEG; Sep. 22, 2002; vol. 3; pp. 111-417-111-420.

* cited by examiner

DYNAMIC DETECTION OF BLOCKING ARTIFACTS

The invention relates to a method of processing a sequence of digital images, intended to detect a grid corresponding to blocking artefacts, said method comprising a step of detecting a spatial grid within a portion of the image.

The invention also relates to a television receiver comprising a processing device using the method of processing images according to the invention.

The invention notably finds its application in the field of detecting blocking artefacts within a sequence of digital images which has previously been encoded and then decoded in accordance with a block-based encoding technique, for example, the MPEG standard ("Motion Pictures Expert Group") and in the correction of data comprised in these blocks in order to attenuate the visual artefacts caused by the block-based encoding technique.

The blocking artefacts constitute a crucial problem for the block-based encoding techniques using a discrete transform of the discrete cosine transform DCT type. They appear in the form of block mosaics which are sometimes extremely visible in the decoded image sequences. These artefacts are due to a strong quantization subsequent to the discrete transform, which strong quantization causes strong discontinuities to appear at the borders of the encoding blocks.

International patent application WO 01/20912 (docket: PHF99579) describes a method with which a grid corresponding to blocking artefacts within a decoded digital image can be detected and localized. This method authorizes the detection of three periodical grid sizes of 8×8, 10×8 and 12×8 pixels, which grid sizes result from principal formats of images used for broadcasting televised digital programs. The 8×8 size corresponds to an image sequence encoded in a format of 576 rows of 720 pixels, the 10-11-11×8 size corresponds to an encoding in a 576×540 format, referred to as encoding format 3/4, and the size 12×8 corresponds to an encoding in a 576×480 format, referred to as encoding format 2/3. The size of the grid is obtained by searching the most frequent horizontal and vertical distances between the blocking artefacts. The horizontal and vertical offsets of the grid size with respect to the origin (0,0) of the image are obtained by searching, among all possible offsets, those which correspond to the presence of the largest number of blocking artefacts.

The prior-art method is subsequently based on the redundancy of the periodical grid size and its offset with respect to the origin of the image, for successive images. Such a method of processing images validates a new periodical grid size (and/or offset) if it has been detected at least a predetermined number of consecutive times.

It is an object of the present invention to propose a data processing method which is more efficient.

Indeed, the time parameter is used as a simple validation tool for the prior-art method of processing images, to a certain extent playing the role of a switch with which a grid having given size and offset parameters can be switched to another completely different grid having different parameter values.

Moreover, it searches only one grid size and one grid offset with respect to the origin of the image. But the grid may be distorted within the image because of a resampling of the image. This distortion may sometimes be known in advance, as in the case of the 3/4 encoding format, where the width of the grid varies in accordance with the 10-11-11 pattern. However, this variation is mostly arbitrary because it originates, for example, from a rate transcoding, an image format conversion in a 16/9 television receiver, from a 4/3 format to, for example, a 16/9 format, a zoom in a portion of the image, an A/D conversion, or even a combination of these different conversions. In this case, the prior-art method retains the grid having the most frequent size and offset and applies a step of correcting blocking artefacts based on this grid, with a risk of a partial or even inefficient correction if the grid has a variable size.

To this end, the image processing method according to the invention is characterized in that it comprises a step of determining a current reference grid from a current spatial grid and a preceding reference grid.

In this way, the image processing method constructs a current reference grid which is suitable for integrating the modifications of the current spatial grid with respect to the preceding reference grid, thus reflecting the fluctuations of grid contents as a function of time. The efficiency of the image processing method is thereby enhanced.

In a particularly advantageous embodiment, a grid comprises sets of at least one blocking artefact, and the reference grid comprises an indicator associated with a set of at least one blocking artefact, the indicator of the current reference grid being updated from the indicator of the preceding reference grid, and from the absence or presence of the set of at least one block artefact associated with the indicator in the current spatial grid.

Taking the spatial redundancies of a set of blocking artefacts into account (a set of blocking artefacts being a part of the grid taken independently and being equal to a block artefact, to a segment of blocking artefacts or to a row comprising blocking artefacts) by way of an indicator, and not by the redundancy of the entire grid as in the prior art, allows a more precise and more reliable way of detecting blocking artefacts. The reference grid may thus be modified by adding or subtracting sets of blocking artefacts in accordance with the value of the indicators associated with them. Moreover, the updating of the reference grid renders parallelism possible between the detection of the grid on the basis of a current image and the correction of the current image on the basis of the preceding reference grid.

These and other aspects of the invention are apparent from and will be elucidated, by way of non-limitative example, with reference to the embodiment(s) described hereinafter.

The present invention relates to a method of processing a sequence of digital images encoded and decoded in accordance with a block-based encoding technique. In our example, the encoding technique used is the MPEG standard based on the discrete cosine transform DCT, but may alternatively be any other equivalent standard, such as, for example, the H.263 or H.26L standard. The processing method first relates to the detection of blocking artefacts due to these block-based encoding techniques and subsequently to the ensuing applications such as, for example, post-processing techniques.

Figure 1:
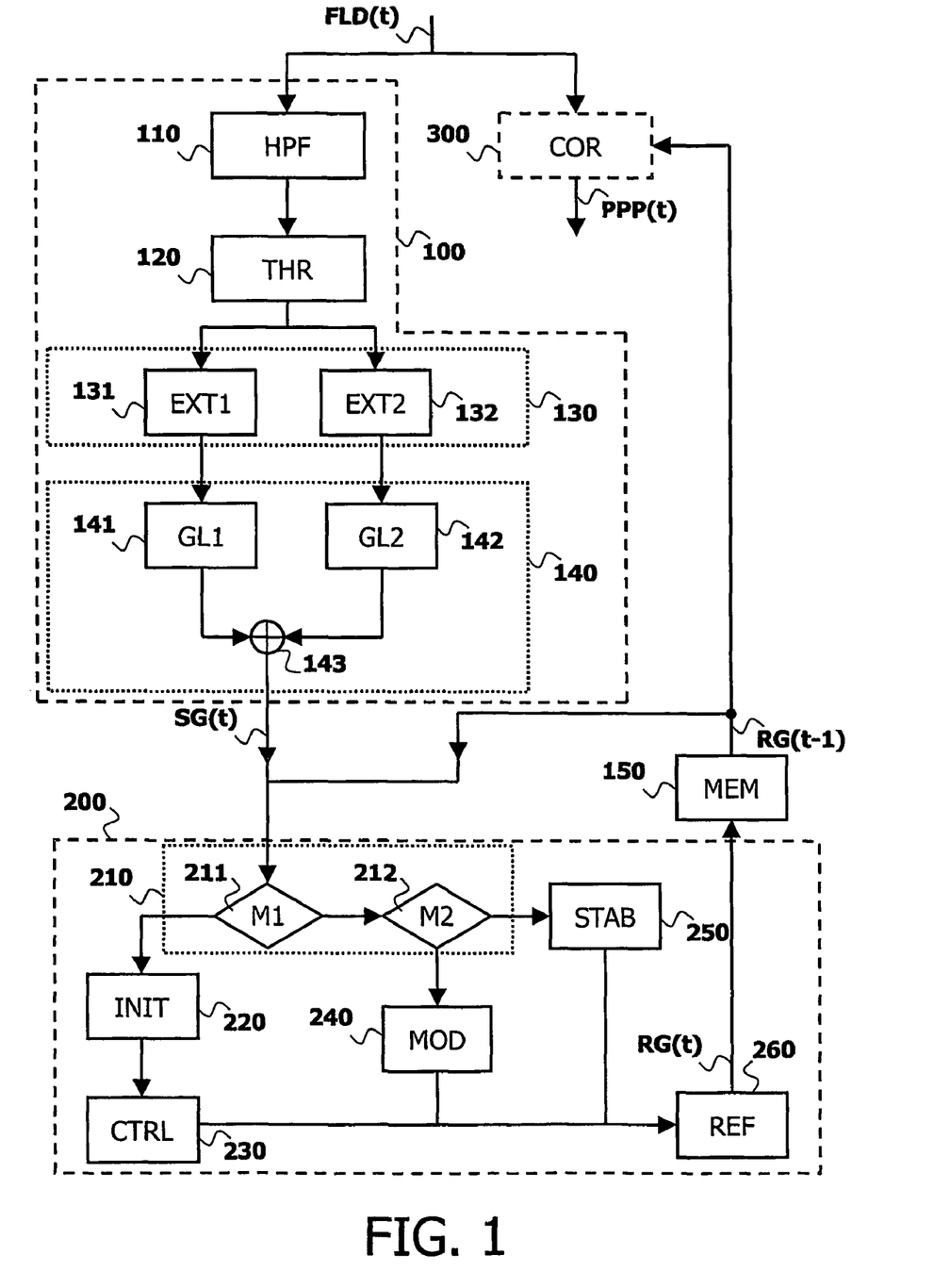
FIG. 1 is a diagram showing a method of processing images according to the invention.

FIG. 1 shows diagrammatically the method of processing a sequence of digital images according to the invention. Said method comprises the steps of:
- detecting (100) a current spatial grid (SG(t)) within a portion of the image constituted by a current field FLD(t)),
- determining (200) a current reference grid (RG(t)) from a current spatial grid (SG(t)) and a preceding reference grid (RG(t-1)) supplied by a memory MEM (150), the current reference grid (RG(t)) being subsequently stored temporarily in the memory MEM (150), and
- correcting COR (300) blocking artefacts which are present in the current field (FLD(t)) from the preceding reference grid (RG(t-1)) so as to supply a processed field (PPP(t)).

These steps will be described in greater detail in the following description.

The data processing method according to the invention comprises a step of detecting the grid within an image. This step may be effected in accordance with different principles such as that described in, for example, patent application WO 01/20912.

In the preferred embodiment, the detection of the grid within a field is effected in accordance with the principle described with reference to FIG. 1. This spatial grid detection first comprises a step of high-pass filtering HPF (110) a portion of a digital image. This portion is, for example, one of two fields of a frame if the image is constituted by two interlaced frames. In the preferred embodiment, the high-pass filtering step is a gradient filtering step using the filter hp1=[1, -1, -4, 8, -4, -1, 1]. This filter is applied horizontally and vertically, row by row, to pixels of luminance Y(m,n) of the current field FLD(t) of a digital image of the sequence, where m and n are integers between 1 and M and between 1 and N, respectively, corresponding to the position of the pixel in the field in accordance with a vertical and a horizontal axis, respectively, (M=288 and N=720 in, for example, the 576×720 encoding format). The result of this filtering operation is preferably constituted by two cards of discontinuity pixels, a horizontal card Eh and a vertical card Ev comprising filtered coefficients Yfh and Yfv, respectively.

The spatial detection of the grid must be able to distinguish the discontinuities corresponding to visible blocking artefacts from those corresponding to natural contours or non-visible blocking artefacts.

That is why the spatial grid detection comprises a threshold step THR (120) intended to detect natural contours and non-visible artefacts. To this end, a coefficient value filtered horizontally Yfh(m,n) and/or vertically Yfv(m,n) must be between two thresholds so as to be able to correspond to a block artefact. The first threshold S1 corresponds to a visibility threshold, whereas the second threshold corresponds to the limit from which the pixel of position (m,n) corresponds to a natural contour. The condition is preferably taken for the absolute value of coefficients filtered as follows:

$S1 < |Yfh(m,n)| < S2$ and $S1 < |Yfv(m,n)| < S2$, with $S1=0.5$ and $S2=20$.

Figure 2:
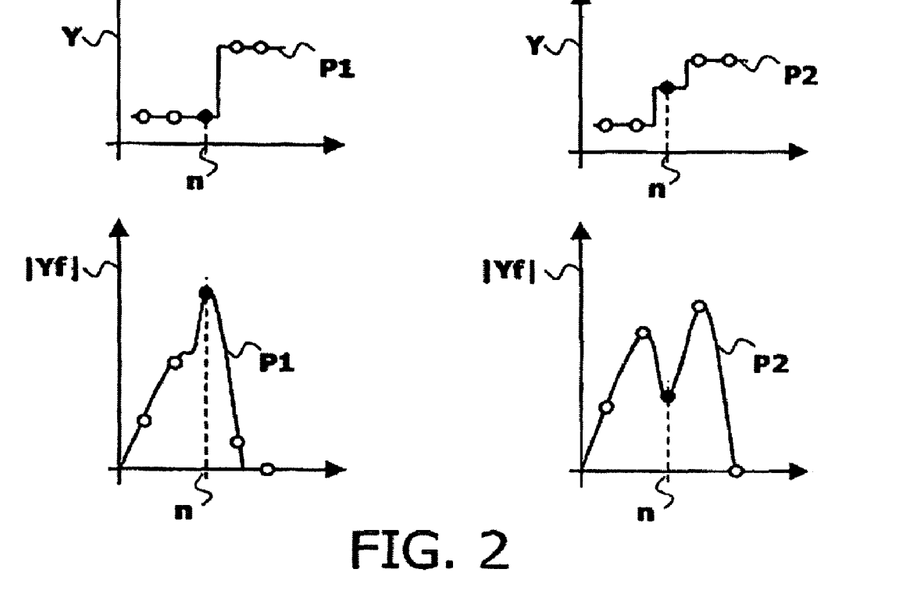
FIG. 2 illustrates two artefact profiles p1 and p2 which are principally encountered in images encoded in accordance with a block-based encoding technique, which profiles are represented in the spatial domain and the frequency domain.

The detection of the spatial grid also comprises a step of extracting EXT blocking artefacts (130) suitable for detecting a first type (131) and a second type (132) of block artefact. The selection of pixels corresponding to blocking artefacts is performed as a function of the values of the filtered coefficients Yf corresponding to the discontinuity pixels. FIG. 2 illustrates the two artefact profiles p1 and p2 in the spatial domain as well as their representation in the frequency domain after filtering with the filter hp1. The first profile p1 corresponds to a standard blocking artifact, while the second profile p2 corresponds to a block artefact which is present in an image that has been subjected to a re-sampling operation or an equivalent processing operation. In the spatial domain, the first profile p1 is a simple step of a staircase, while the second profile p2 is a double step of a staircase. In the frequency domain, the first profile p1 is expressed by a peak, while the second profile p2 is expressed by a double peak.

A vertical artefact corresponding to profile p1 is detected by scanning the vertical card Ev in accordance with a horizontal direction corresponding to the row m if the following condition is satisfied:

$|Yfv(m,n)| > |Yfv(m,n+k)|$ with $k=-2, -1, +1, +2$.

The border of the block is localized between the pixel of position (m,n) and that of position (m,n+1) if $|Y(m,n)-Y(m,n-1)| < |Y(m,n)-Y(m,n+1)|$ and between the pixel of position (m,n-1) and that of position (m,n) in the opposite case.

An artefact corresponding to profile p2 is detected if the following cumulative conditions are satisfied:

$f1 \cdot |Yfv(m,n)| < (|Yfv(m,n-1)| + |Yfv(m,n+1)|)$ $|Yfv(m,n-1)| > f2 \cdot |Yfv(m,n-2)|$ $|Yfv(m,n+1)| > f2 \cdot |Yfv(m,n+2)|$ with f1=6 and f2=2 in the preferred embodiment.

The border of the block is localized between the pixel of position (m,n-1) and that of position (m,n).

The detection of a horizontal artefact corresponding to each profile p1 and p2 is effected in a similar manner by scanning the horizontal card Eh comprising the coefficients Yfh(m,n) filtered in a vertical direction corresponding to the column n.

The detection of the spatial grid also comprises a step of searching GL (140), within the current field, rows of pixels having a high density of segments of elementary blocking artefacts as compared with neighboring rows. This search step is performed for the rows comprising blocking artefacts of the first type (141) or blocking artefacts of the second type (142), the grid rows thus obtained being re-assembled (143) for forming the current spatial grid SG(t).

To this end, the search step first comprises a selection sub-step intended to select segments in a horizontal or vertical row of the card of discontinuity pixels, which segments comprise a number of consecutive blocking artefacts which is higher than a predetermined threshold S0. Indeed, the isolated discontinuities generally correspond to supplementary noise, while the blocking artefacts which are due to a coarse quantization of the DCT coefficients generally cause linear faults to appear along the encoding blocks. The value S0 of the predetermined threshold must not be too low so as not to favor the false detections. It must neither be too high so as not to constrain the selection too much by reducing the number of segments of detected elementary blocking artefacts. In practice, the value S0 is fixed at 3 for a field of 288 rows of 720 pixels.

The search step also comprises a sub-step of computing a level $Nb_i$ of the blocking artefacts per row $L_i$, i being an integer corresponding to the number of the row in the field. In the preferred embodiment, the level of the blocking artefacts is obtained by counting the number of pixels associated with the segments of elementary artefacts present in a row. By way of variant, the level of blocking artefacts may be obtained by adding the values of the filtered coefficients Yf of the discontinuity pixels corresponding to the elementary artefacts of the selected segments in a row.

The search step finally comprises a sub-step of determining grid rows, a row being detected as such by comparison with a set of neighboring rows.

In the case of the first profile p1, a row $L_i$ is determined as being a row of the grid based on a comparison of block artefact levels of a current row $L_i$, of the row which precedes immediately $L_{i-1}$ and of the row which follows immediately $L_{i+1}$, if:

$$Nb_i > \alpha(Nb_{i-1} + Nb_i + Nb_{i+1}) \text{ and } Nb_i > T1 \cdot Nb$$

where α is a coefficient which is equal to ⅔ in our example for the detection of vertical rows, and to 3/5 for the detection of horizontal rows; T1 is a minimum percentage of artefacts in a row with which this row can be considered to belong to the grid, which percentage is taken to be equal to 20% in our example, and wherein Nb is the number of pixels per row, i.e. 720 or 288 in our example.

In the case of the second profile p2, a row $L_1$ is determined as being a row of the grid based on a comparison of block artefact levels of a current row $L_i$ and of the rows which precede immediately $L_{i-1}$ and $L_{i-2}$ and follow immediately $L_{i+1}$ and $L_{i+2}$ if:

$$Nb_i > \beta(Nb_{i-2} + Nb_{i-1} + Nb_i + Nb_{i+1} + Nb_{i+2}) \text{ and }$$
$$Nb_i > T2 \cdot Nb$$

wherein β is a coefficient which is equal to 2/3 in our example; T2 is a minimum percentage of artefacts in a row, which is equal to 20% in our example. The condition $Nb_i > T2 \cdot Nb$ provides the possibility of controlling the reliability of the system; by increasing the value of T2, the risk of false detections is reduced.

The detection of a spatial grid, which will now be described, is suitable for detecting a current spatial grid SG(t) for a current field FLD(t). The method of processing images according to the invention comprises a step of determining (200) a reference grid RF(t) from parameters of the current spatial grid SG(t) and a preceding reference grid RG(t-1). These parameters are, for example, the number of rows of the grid or the value of a confidence indicator associated with a grid row, as we will see hereinafter.

The detection of the reference grid is shown diagrammatically in FIG. 1 and comprises three principal steps.

First, it comprises a step of selecting (210) a mode of operation from statistics of current spatial grids SG(t) and temporal preceding grids RG(t-1). In the preferred embodiment, there are 3 modes of operation. The first mode of operation is a mode of initializing INIT (220) the reference grid, the second mode of operation is a mode of modifying MOD (240) the reference grid and the third mode of operation is a mode of confirming STAB (250) the reference grid.

The selection step opts for the initialization mode if different non-cumulative conditions are satisfied. In accordance with a first condition, this mode of operation is activated by an exterior re-initialization due to, for example, a change of program or a change of channel, involving a change of the sequence of digital images to be processed. In accordance with a second condition, the initialization mode is activated by a strong increase of the number of grid rows in the current spatial grid SG(t) with respect to the number of grid rows in the preceding spatial grid SG(t-1). In our example, the initialization mode is activated if the number of grid rows of the current spatial grid SG(t) is higher than 3 times the number of grid rows of the preceding spatial grid SG(t-1). In accordance with a third condition, the initialization mode is activated if a large part of the grid rows of the current spatial grid SG(t) is offset with respect to the grid rows of the preceding reference grid RG(t-1). This is the case in our example if the number of grid rows of the current spatial grid SG(t) offset with respect to the grid rows of the preceding reference grid RG(t-1) (i.e. the total number of horizontal and vertical grid rows of the current spatial grid SG(t) which do not belong to the preceding reference grid RG(t-1)) is higher than one third of the total number of grid rows of the preceding reference grid RG(t-1). Finally, the initialization mode is activated if no current spatial grid SG(t) is detected. This is notably the case when the number of grid rows is lower than a predetermined threshold Smin, as a function of horizontal H and vertical V dimensions of the field and is equal, in our example, to:

$$Smin = (H+V)/48.$$

The initialization mode (220) consists in reconstructing the current reference grid RG(t) from the current spatial grid SG(t). It also consists in giving a maximum value, equal to 5 in our example, to a confidence indicator associated with each grid row. By way of variant, the initialization mode (220) can reconstruct the current reference grid RG(t) from the current spatial grid SG(t) and the preceding spatial grid SG(t-1).

The determination of the reference grid also comprises a step of controlling the stability CTRL (230) following the initialization (220). This control step has the object of detecting instability in the detection of the reference grid, which instability is notably due to several successive re-initializations. This is notably the case if the sequence of processed digital images is an original sequence, i.e. a sequence of images which has not been encoded and then decoded. The step of controlling the stability thus detects a predetermined number of successive re-initializations, equal to 5 in our example, and generates an indication with which a step of correcting the current field FLD(t) cannot be performed.

The selection step opts for the modification mode (240) if the initialization mode has not been selected and if there is a large similarity between the current spatial grid SG(t) and the preceding reference grid RG(t-1). This is the case, in our example, when the number of grid rows differing between the current spatial grid SG(t) and the preceding reference grid RG(t-1) (i.e. the total number of horizontal and vertical grid rows of the current spatial grid SG(t) which do not belong to the preceding reference grid RG(t-1) plus the total number of horizontal and vertical grid rows of the preceding reference grid RG(t-1) which do not belong to the current spatial grid SG(t)) is smaller than one third of the grid rows of the preceding reference grid RG(t-1)).

The modification mode (240) consists in incrementing or decrementing the confidence indicators associated with the grid rows of the preceding reference grid RG(t-1) in order to obtain the current reference grid RG(t), a confidence indicator being incremented or decremented in accordance with the presence or absence, respectively, of the grid row associated with said indicator in the current spatial grid (SG(t)). The modification mode also consists in completing the current reference grid RG(t) with respect to the preceding reference grid RG(t-1) with grid rows which are present in the current spatial grid SG(t) and which were not in the preceding reference grid RG(t-1) or, in contrast, to withdraw, from the current reference grid RG(t) with respect to the preceding reference grid RG(t-1), the grid rows whose confidence indicator, once decremented, has become equal to 0.

Figure 3A:
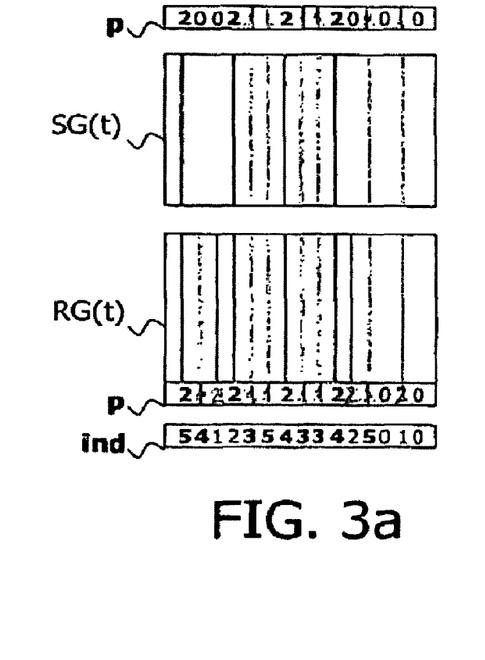
FIG. 3a illustrates the updating of a reference grid from a current spatial grid and FIG. 3b illustrates the comparison between a preceding reference grid and a current spatial grid, FIG. 4 describes a method of correcting blocking artefacts, and FIG. 5 describes the principle of correcting a blocking artefact of the type p2.
Figure 3B:
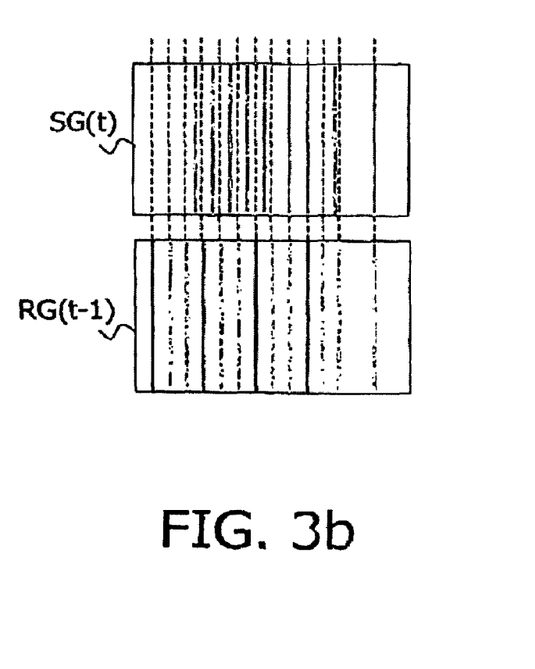

FIG. 3a illustrates the updating of a reference grid RG from a current spatial grid SG(t). Each grid comprises a certain number of grid rows of the type p equal to 1 for a grid row comprising blocking artefacts of the type p1, shown in grey in FIG. 3, or of the type p equal to 2 for a grid row comprising blocking artefacts of the type p2 shown in black in FIG. 3.

After the update, the current reference grid RG(t) has incremented the confidence indicators of the grid rows which are present in the preceding reference grid RG(t-1) and in the current spatial grid SG(t), has set to one the confidence indicators of the grid rows which are solely present in the current spatial grid SG(t), and has decremented the confidence indicators of the grid rows which are solely present in the preceding reference grid RG(t-1), the value of the confidence indicators remaining between 0 and 5 in our example. The grid rows, whose confidence indicator value is lower than a predetermined value Sconf equal to 3 in our example, shown in broken lines in FIG. 3a, will not be corrected in the correction step.

FIG. 3b illustrates the comparison between a row of the preceding grid and of the current spatial grid. The rows in broken lines lengthen the grid rows of the preceding reference grid RG(t-1). Five grid rows of the current spatial grid SG(t) are not aligned with the grid rows of the preceding reference grid RG(t-1), i.e. more than one third of the 13 grid rows are found in the preceding reference grid RG(t-1). In this case, the selection step thus opts for the initialization mode, in which the third condition is satisfied.

Finally, the selection step opts for the confirmation mode STAB (250) by default when none of the other modes is selected.

The confirmation mode STAB (250) consists in conserving the preceding reference grid: RG(t)=RG(t-1), and in preferably incrementing the confidence indicators of the grid rows which are higher than or equal to the predetermined value Sconf, equal to 3 in our example.

The temporal detection of the grid finally comprises a step of refining REF (260) the distance between the grid rows, which step is a continuation of the mode of operation which has been selected. The refining step has for its object to verify whether the grid rows of the current reference grid RG(t), which will be obtained, are within a given range of values. Indeed, the space between the grid rows should neither be too large nor too small. To this end, the refining step determines an average distance from the distances between two successive grid rows, both in accordance with a horizontal direction davgH and a vertical direction davgV, while the distance between two successive grid rows must be between a minimum and a maximum boundary so as to be taken into account. These minimum and maximum boundaries correspond to a minimum and a maximum size of the encoding blocks. In our example, the minimum boundary is 6 in the horizontal direction and 3 in the vertical direction; the maximum boundary is 21 in any of the two directions. Subsequently, the refining step verifies whether the distance between two horizontal or vertical rows is larger than the distance dh or dv, respectively, such that dh is the maximum value between davgH and 6, and dv is the maximum value between davgV and 3. If a row detected as being a new grid row in the reference grid RG(t) does not comply with these conditions, it is withdrawn from the reference grid.

An application of the data processing method according to the invention is constituted by post-processing images, intended to correct the blocking artefacts which are present in the grid rows. The correction depends on the confidence indicator value of a grid row, the correction being applied, as we have seen hereinbefore, when said indicator is higher than or equal to a predetermined value Sconf which is equal to 3 in our example. It depends also on the type p of the grid row.

Figure 4:
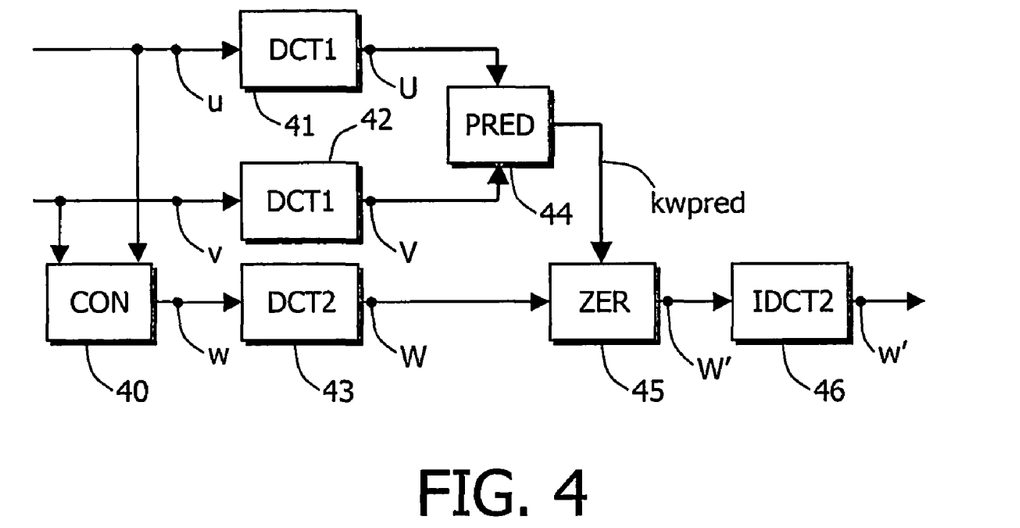

If the block artefact corresponds to the profile p1, the correction described with reference to FIG. 4 is applied. The method of correcting blocking artefacts comprises the steps of computing a first discrete cosine transform DCT1 (41) of a first set of N data u, situated at the left or above the border of the block, computing a second discrete cosine transform DCT1 (42) of a second set of N data v, situated at the right or below the border of the block and adjacent to the first set, computing a global discrete cosine transform DCT2 (43) of a set of 2N data w corresponding to the concatenation CON (40) of the first and second sets and providing a set of transformed data W, determining PRED (44) a predicted maximum frequency kwpred from the transformed data U and V obtained from the first (41) and the second (42) transform DCT1, computed in the following manner:

$$kwpred = 2.\max(kumax, kvmax) + 2$$

$$\text{with } kumax = \max(k \in \{0, \ldots, N-1\} / abs(U(k)) > T)$$

$$kvmax = \max(k \in \{0, \ldots, N-1\} / abs(V(k)) > T)$$

where T is a threshold which is different from zero, correcting ZER (45) by setting the odd transformed data W from the global discrete cosine transform to zero, whose frequency is higher than the predicted maximum frequency, yielding corrected data W', computing an inverse discrete cosine transform IDCT2 (46) of the corrected data, yielding filtered data w' which are subsequently intended to be displayed on the screen.

Figure 5:
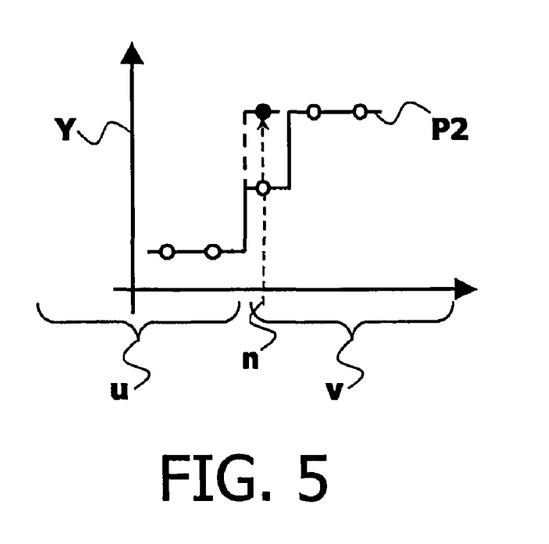

If the blocking artefact corresponds to the profile p2, the correction must be modified considerably. Indeed, the position of the border of the block must be given more precisely because of the double step of the staircase corresponding to the profile p2, as illustrated in FIG. 5. To this end, the correction method preliminarily comprises a step of re-adjusting the luminance value of the intermediate pixel p(n) intended to give said luminance value the luminance value of the pixel which is situated directly on its right p(n+1). The previously described steps are then applied, in which the border of the block is present at the left of the intermediate pixel, which then forms part of the segment v. By way of variant, it is alternatively possible to choose the luminance value of the intermediate pixel to correspond to that of the pixel on the left, or to that of the pixel having the nearest luminance value. In both cases, the positioning of the segments u and v is adapted accordingly so as to apply the correction step.

It is possible to implement the processing method according to the invention by means of a television receiver circuit, said circuit being suitably programmed. A computer program stored in a programming memory may cause the circuit to perform the different operations described hereinbefore with reference to FIG. 1. The computer program may also be loaded into the programming memory for reading a data carrier such as, for example, a disc comprising said program. The reading operation may also be performed by means of a communication network such as, for example, the Internet. In this case, a service provider will put the computer program in the form of a downloadable signal at the disposal of those interested.

Any reference sign between parentheses in the present text should not be construed as being limitative. Use of the verb "comprise" and its conjugations does not exclude the presence of elements or steps other than those stated in the claims. Use of the article "a" or "an" preceding an element or step does not exclude the presence of a plurality of such elements or steps.

The invention claimed is:

1. A method of processing a sequence of digital images, intended to detect a grid (SG, RG) corresponding to blocking artifacts within said sequence of digital images using a circuit suitably programmed to perform the steps of:

detecting a spatial grid (SG) within a portion of the image, determining a current reference grid (RG(t)) from a current spatial grid (SG(t)) and a preceding reference grid (RG(t-1)), based on a row comparison between said current reference grid and said preceding reference grid, wherein a number of grid rows differing between the current spatial grid SG(t) and the preceding reference grid RG(t-1) is smaller than one third a number of grid rows of the preceding reference grid RG(t-1);

determining corrected blocking artifacts in said current reference grid (RG(t)) based on artefacts within said current spatial grid SG(t) and artefacts within said preceding reference grid RG(t-1);

assigning said corrected blocking artefacts to said current reference grid RG(t); and outputting said current reference grid RG(t), wherein said grid (SG, RG) comprises sets of at least one block artefact within each row and, wherein an indicator of the current reference grid (RG(t)) is updated from the corresponding indicator of the preceding reference grid (RG(t-1)) and from a presence or absence of the set of at least one block artefact associated with said indicator in the corresponding row of said current spatial grid (SG(t)), said indicator (ind) being associated with a set of at least one block artefact.

2. An image processing method as claimed in claim 1, wherein the set of blocking artefacts is constituted by a row of the portion of the image having a blocking artefact density which is higher than that of the neighboring rows.

3. An image processing method as claimed in claim 1, wherein the step of detecting the spatial grid is intended to perform a high-pass filtering operation on the portion of the image, such that at least one card of discontinuity pixels is supplied, and to detect a first type (p1) of block artefact and a second type (p2) of block artefact from the at least one card of discontinuity pixels.

4. An image processing method as claimed in claim 1, wherein said step of determining corrected blocking artefacts that are present in the current reference grid (RG(t)) is performed in accordance with their type (p1, p2).

5. An image processing method as claimed in claim 1, wherein the step of determining corrected blocking artefacts that are present in a set of blocking artefacts of the current reference grid (RG(t)) is performed in accordance with a value of the indicator (ind) associated with said set.

6. A television receiver comprising:

a processing device-to detect a reference grid (RG) within a sequence of digital images executing the steps of:

detecting a spatial grid (SG) within a portion of the image, determining a current reference grid (RG(t)) from a current spatial grid (SG(t)) and a preceding reference grid (RG(t-1)), based on a row comparison between said current reference grid and said preceding reference grid, wherein a number of grid rows differing between the current spatial grid SG(t) and the preceding reference grid RG(t-1) is smaller than one third a number of grid rows of the preceding reference grid RG(t-1), wherein said SG and RG grids each comprise sets of at least one block artefact within each row of said grids and wherein the reference grid (RG) comprises an indicator (ind) associated with a set of at least one block artefact, wherein an indicator of the current reference grid (RG(t)) is updated from the corresponding indicator of the preceding reference grid (RG(t-1)) and from a presence or absence of the set of at least one block artefact associated with said indicator in the corresponding row of said current spatial grid (SG(t)) wherein a grid (SG, RG) comprises sets of at least one block artefact within each row and, wherein an indicator of the current reference grid (RG(t)) is updated from the corresponding indicator of the preceding reference grid (RG(t-1)) and from a presence or absence of the set of at least one block artefact associated with said indicator in the corresponding row of said current spatial grid (SG(t)), said indicator (ind) being associated with a set of at least one block artefact;

correcting blocking artefacts in accordance with a value of the indicator (ind) associated with each of said sets;

assigning said corrected blocking artefacts to said current reference grid RG(t); and displaying said current reference grid containing said corrected blocking artefacts.

7. A device for processing a sequence of digital images, intended to detect a grid (SG, RG) corresponding to blocking artefacts within said sequence of digital images, said device comprising:

means for detecting a spatial grid (SG) within a portion of the image, means for determining a current reference grid (RG(t)) from a current spatial grid (SG(t)) and a preceding reference grid (RG(t-1)), based on a row comparison between said current reference grid and said preceding reference grid, wherein a number of grid rows differing between the current spatial grid SG(t) and the preceding reference grid RG(t-1) is smaller than one third a number of grid rows of the preceding reference grid RG(t-1);

means for correcting the blocking artefacts which are present in the current reference grid (RG(t)) in accordance with a value of the indicator (ind) associated with each of said sets wherein said grid (SG, RG) comprises sets of at least one block artefact within each row and, wherein an indicator of the current reference grid (RG(t)) is updated from the corresponding indicator of the preceding reference grid (RG(t-1)) and from a presence or absence of the set of at least one block artefact associated with said indicator in the corresponding row of said current spatial grid (SG(t)), said indicator (ind) being associated with a set of at least one block artefact; and means for outputting said corrected blocking artefacts.

8. A non-transitory computer readable storage medium comprising a set of instructions, stored in a programming memory, which, when loaded into a circuit, causes said circuit to perform:

detecting a spatial grid (SG) within a portion of the image, determining a current reference grid (RG(t)) from a current spatial grid (SG(t)) and a preceding reference grid (RG(t-1)), based on a row comparison between said current reference grid and said preceding reference grid, wherein a number of grid rows differing between the current spatial grid SG(t) and the preceding reference grid RG(t-1) is smaller than one third a number of grid rows of the preceding reference grid RG(t-1) wherein said a grid (SG, RG) comprises sets of at least one block artefact within each row and, wherein an indicator of the current reference grid (RG(t)) is updated from the corresponding indicator of the preceding reference grid (RG(t-1)) and from a presence or absence of the set of at least one block artefact associated with said indicator in the corresponding row of said current spatial grid (SG (t)), said indicator (ind) being associated with a set of at least one block artefact:

correcting blocking artefacts based on artefacts within said current spatial grid SG(t) and artefacts within said preceding reference grid RG(t-1);

assigning said corrected blocking artefacts to said current reference grid RG(t); and outputting said corrected blocking artefacts.

* * * * *